United States Patent [19]
Bois

[11] 3,826,277

[45] July 30, 1974

[54] VENT VALVE WITH PILOT VALVE FOR OIL-TANKER STORAGE TANKS

[76] Inventor: Louis Marius Jean Bois, Lotissement des Charmes, Norges-la-Ville (Cote-d'Or), France

[22] Filed: Oct. 27, 1972

[21] Appl. No.: 301,296

[30] Foreign Application Priority Data
Nov. 2, 1971 France .................. 72.39159
Apr. 20, 1972 France .................. 72.13930

[52] U.S. Cl. ............... 137/493, 137/71, 137/492.5, 137/604
[51] Int. Cl. .......................... F16k 17/196
[58] Field of Search ........... 137/68, 71, 492.5, 493, 137/526, 527, 604, 527.6

[56] References Cited
UNITED STATES PATENTS

| | | | |
|---|---|---|---|
| 2,506,737 | 5/1950 | Paquin .................. | 137/613 X |
| 2,619,113 | 11/1952 | Myers et al. .............. | 137/493 |
| 2,866,475 | 12/1958 | Sutherlin et al. .......... | 137/604 |
| 2,872,938 | 2/1959 | Hansen et al. ............. | 137/526 X |
| 2,877,792 | 3/1959 | Tybus .................... | 137/527 X |
| 2,879,786 | 3/1959 | Heideman ................. | 251/175 X |
| 2,928,413 | 3/1960 | Hansen ................... | 137/526 X |
| 2,931,378 | 4/1960 | Davies ................... | 137/493 X |
| 2,971,531 | 2/1961 | Jurs et al. ............... | 137/493.9 |
| 3,592,224 | 7/1971 | Bois ..................... | 137/493 X |

FOREIGN PATENTS OR APPLICATIONS
635,775   1/1962   Canada ...................... 137/71

Primary Examiner—William R. Cline
Assistant Examiner—Gerald A. Michalsky
Attorney, Agent, or Firm—McGlew and Tuttle

[57] ABSTRACT

A vent valve having a pilot-valve, for oil-tanker storage tanks, comprises a flared casing offering maximum flow section when the associated obturator member is in the open position, within the casing and beneath a seat terminating the same, the seat having a diameter at least equal to that of the inlet conduit of the casing and being surmounted by a flame-guard and a discharge nozzle both of which are external to the casing. The vent valve may comprise a main expandable valve with a rigid inner end-surface which is profiled by an outwardly directed border the end section of which is fixedly restrained level with the widest part of the casing and is joined by a deformable, flexible and annular wall to a movable upper or outer end-surface having a central profiled extension, which end-surface is provided with a lining which forms a seal upon contacting the sealing seat.

4 Claims, 3 Drawing Figures 3,826,277

VENT VALVE WITH PILOT VALVE FOR OIL-TANKER STORAGE TANKS

FIELD AND BACKGROUND OF THE INVENTION

Hydrocarbons are transported in oil-tanker storage tanks by providing cargo venting means not only during transport but also at the loading and unloading points. This is necessary because the permissible overpressures and the more limited negative pressures which the tanks can withstand must be very closely observed. Furthermore, special safety requirements must be met, especially when filling the tanks, since the effluents must be discharged into the atmosphere at a distance from the ship and at sufficiently high velocity to prevent exposive mixtures from forming in proximity.

Already known are vent valves which, if they are to function with precision, invariably embody complex mechanisms yet do not offer the desirable jet discharging capability.

SUMMARY OF THE INVENTION

The present invention has for its prime object to meet this requirement by providing a valve of simple and inexpensive construction that offers the added advantages described hereinafter.

The invention accordingly relates to a valve with an internal expandable valving element, characterized by the fact that the valve casing is of tapering shape with a maximum diameter lying in the plane reached by the valve flap when it is flattened in its open position, the valve seat, the diameter of which is at least equal to that of the inlet duct on the side of the storage tank to be protected, being associated externally to a flame-guard and to an ejection nozzle.

Such an arrangement makes it possible to create optimum gas ejection conditions, with the result that a relatively low driving pressure produces a long-range jet.

Further, marine applications of such apparatus are facilitated through a masking of the nozzle by automatically retractable flaps, but on the other hand these flaps are carried by a cap maintained in spaced relationship with the seat-forming valve dome supporting the flame-guard and the nozzle by spacers, thereby leaving a permanently open passage (even with closed flaps) for the ingress of air when the valve opens under depression, and also an air extractor effect during delivery in the overpressure mode.

From the design standpoint, this cap is connected to one side of the casing by a mobile connection such as a hinge connection, and on the other by a spacer member hinged to the casing and receiving a nut on the cap. The latter further supports spacers which upon expanding bear against the flange joining the nozzle to the dome, thus enabling the joint between the dome and the base of the casing to be tightened.

The removability of the dome, rendered possible in this way, facilitates inspection and maintenance of the epxandable valve.

The latter is carried by at least one hollow arm extending transversely through the valve casing, which arm contains the tubular pressure take-off that causes the operations to be triggered by a pilot valve supported on the end of the arm, externally of the casing. The interior of the arm additionally forms a feed duct for the space within the valve.

Preferably, the arm terminates in a plate on which the pilot valve casing is pivotally mounted and latchable in an angular position.

This arrangement allows operation of the valve to be momentarily interrupted if need be.

Further, an obturator within the pilot-valve body is actuated by a membrane and controlled by the elastic action of a rating spring. The spring, its thrust member and its pusher are devised as a unit which is inserted beneath a plug and is readily removable in one piece, having been appropriately marked after being preset.

Accordingly, the operational rating of the main valve can be determined by inserting such a unit beneath the plug of the pilot valve, the unit having been selected among an available range thereof, and this without the need for any spring adjustments.

In an alternative embodiment, the expandable main valve includes a rigid lower end which is profiled to form a bowl with sloping sides and a rim fixedly located level with the widest part of the casing. This rim is joined by a flexible and deformable annular wall to a movable upper end having a central profiled portion, which upper end is provided with a lining forming a seal upon contacting the sealing seat.

Thus, in the direction of flow corresponding to discharge, the gas and vapors impinge upon a fixed and fully rigid wall from which the deformable wall is sheltered, whereas the profiled portion of the upper end improves the flow through the exit zone.

This makes it unnecessary to devise the expandable element in the form of a bladder, since it can be configured as a ring sealingly connected, on the other hand, to the raised edge of the inner-end-surface forming wall and, on the other, to the peripheral portion of the outer end of the expandable valve.

For in the first form of embodiment hereinbefore described, in the open configuration with the bladder flattened and the main valve consequently open, the second reinforcement of the mobile upper end surface or the bladder is applied against the first reinforcement of the bottom end, with the frusto-conical ring edge accordingly descending level with the widest part of the casing. The passageway section then becomes appropriate to a high flow rate, especially downstream of the main valve.

On the other hand, in the case of a gas and vapor flow out into the atmosphere upstream of the main valve, a flanging bladder wall that forms a ring limited internally by the periphery of the lower end surface and externally by the edge of the upper-end-surface ring, is subjected directly to the impact of such a flow and perturbs the stream by reason of the uncontrolled beat motions to which the stream is subjected.

The same applies, though to a lesser extent, in the case of a reverse flow of incoming air in the event of the tank tending to be set under negative pressure (incoming air invariably flows at a much lower velocity than discharging gases and vapors). Obviously, every attempt is made to limit gas and vapor losses by accepting overpressures higher than the possible depressions, as a result of which the gas and vapor discharges are always more violent.

Safety considerations naturally require that the ejection flows involve high outputs, with pressure losses reduced to a minimum, notably in order to be able to discharge the gas and vapor as high as possible above the ship so as to avoid all danger of intoxication of the crew, as well as a fire hazard due to extensive dilution of the inflammable elements in the air.

The second form of embodiment consequently better meets the safety requirements mentioned above.

The description which follows with reference to the accompanying non-limitative exemplary drawings will give a clear understanding of how the invention can be carried into practice.

DESCRIPTION OF THE PREFERRED EMBODIMENTS

Figure 1:
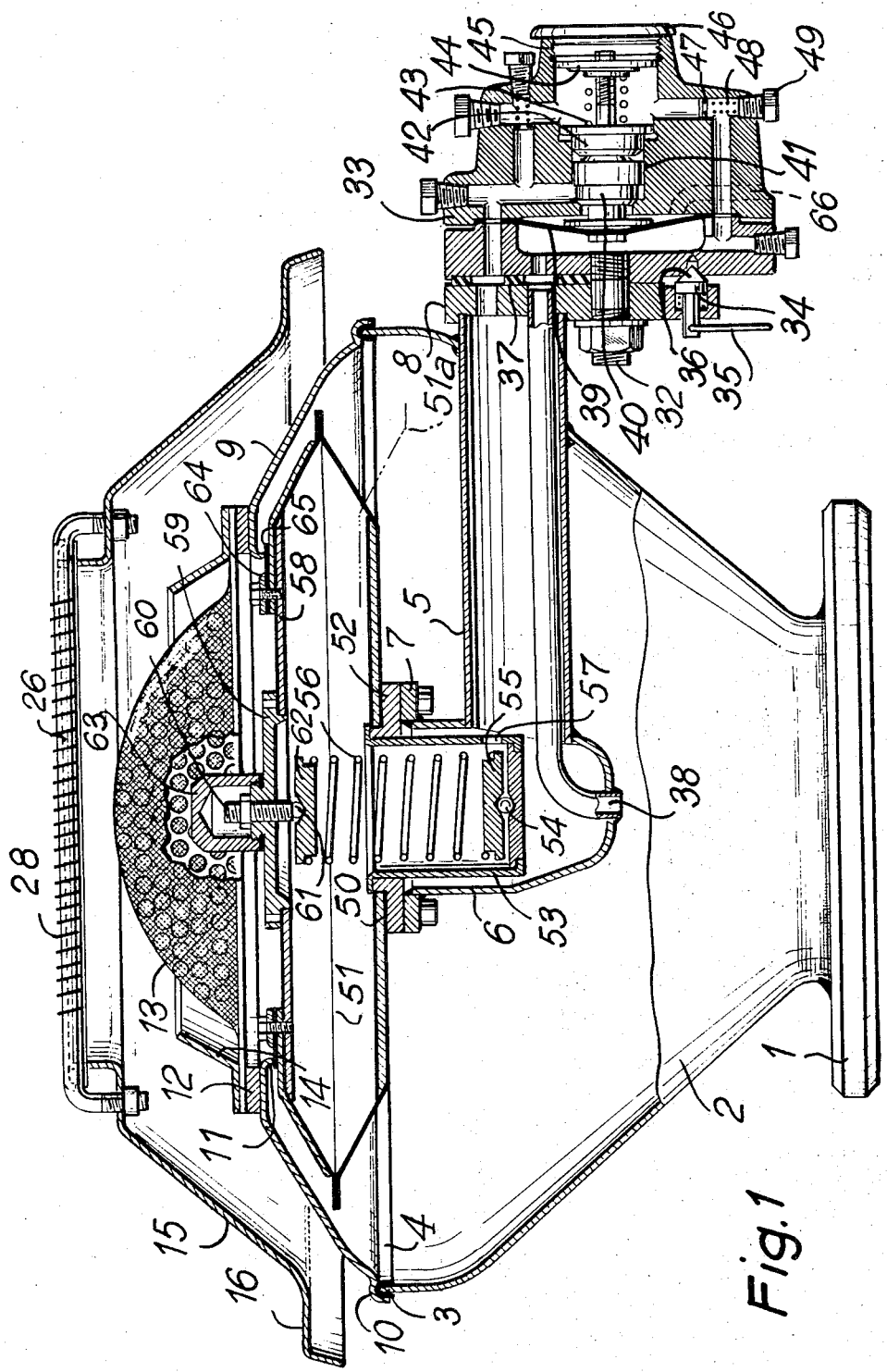
FIG 1 is a sectional view of a storage tank vent valve for an oil tanker.
Figure 2:
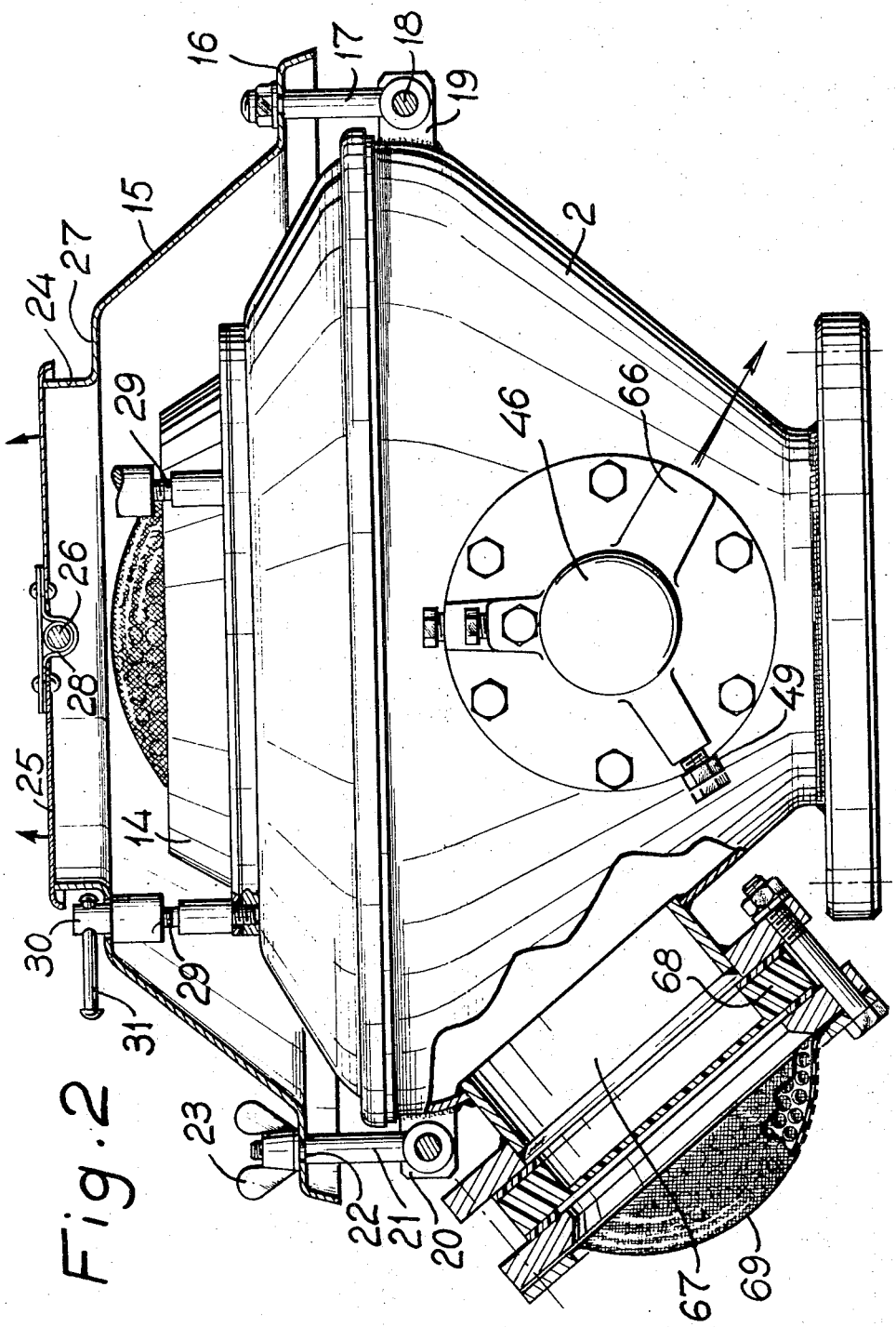
FIG. 2 is a side elevation view of the valve unit with partial cutaway portions.

In the embodiment shown in FIGS. 1 and 2, there is connected to a flange 1 on a storage tank orifice the base 2 of a valve housing, base 2 being flared and terminating in a rim 3 provided with an elastic seal 4. The maximum diameter of the flared base lies a little below the rim 3.

Extending transversely through base 2 is a hollow arm 5 welded to the casing wall and supporting an axial jacket 6 the lower end of which is profiled and forms a closed end, while its upper end is open and formed with a flange 7.

The outer end of arm 5 supports an offset mounting plate 8.

In the inoperative position, the seal 4 is surmounted by a dome 9 which is formed to that end with a corresponding groove 10 cooperating with seal 4. Dome 9 is formed with an axial opening terminating in an inwardly turned rim 11 to form an obturator seat. Upon the periphery of rim 11, the dome receives, via a flange 12, a dome-shaped flame-guard 13 made of wire mesh reinforced with perforated metal sheet. The flange 12 additionally receives the flange of a convergent discharge nozzle 14.

Supported in spaced relationship above the dome 9, the nozzle 14 and the flame-guard 13, is an annular cover 15 having a stepped profile and which, through the agency of an annular rim 16 facing the rim of dome 9, is bolted to parallel pillars 17 each pivotally connected to a pin 18 carried in a lug 19 fast with the rim of casing 2, while clevis-forming diametrically opposed lugs carry the hinge pin for a tie-rod 21 cooperating with a thrust surface 22 on the opposite notched portion of the rim 16, beneath a wing-nut 23.

The cover 15 is formed with a central vent 24 coaxially above the outlet of nozzle 14. This vent is obturated by a pair of semicircular flaps 25 hingedly connected to a diametrical shaft 26 which is secured through having its turneddown ends bolted into an annular rim 27 at the foot of vent 24. A coil spring 28 surrounds shaft 26 and urges the two flaps 25 into their mutually spaced position applied against the outlet of vent 24.

The rim 27 further carries uniformly spaced tie-rods 29 which are formed with external heads 30 having sliding actuating rods 31 and which bear internally against the nozzle flange 14 superimposed above flange 12.

Supported on mounting plate 8 by a stud 32 is the housing of a pilot valve 33. A spring-operated plunger type latching mechanism 34 extends through plate 8 and has an actuating ring 35 on one side and a plunger 36 cooperating with matching holes in housing 33. A perforated gasket 37 is interposed between mounting plate 8 and rotating housing 33 to permit communicating the ducts and chambers of housing 33 with pressure take-off pipe 38 extending through arm 5 and debouching axially at one end through jacket 6 and at the other end into plate 8. An adjacent orifice communicates with the interior of the arm.

The pilot valve 33 includes in its casing, in the conventional manner, a chamber divided by a membrane 39 which carries in its middle the stem of an obturator 40 capable of moving with the membrane. The head of the obturator is guided through a bore 41 within which is likewise movable a pusher 42 associated to a calibrated spring 43 reacting against a thrust face 44. The assembly consisting of the pusher and its stem, the spring and its thrust face, is devised to form a one-piece unit that need not be dismantled and which can be slipped through bore 41 and into a lodging until the thrust face abuts against a circlip 45 engaging into a groove in said lodging, the whole beneath a plug 46 which covers the lodging and bears against a seal.

Further, the network of ducts within the pilot valve housing is provided with calibrated jets such as the jet 47 set into associated seats and retained thereon by a spring 48 interposed between each jet and plug 49.

The open upper rim of jacket 6 is fast with the flange 7, onto which is screwed and bolted the end reinforcement 50 of bladder-obturator 51. The central perforated portion of an intermediate thrust surface 52, onto which reinforcement 50 is screwed, receives a cup 53 inside which a ball 54 provides an abutment for the end cap 55 of a spring 56. Cup 53 is formed with at least one opening 57 in its wall for communication between the interior of bladder 51 and the interior of arm 5.

Screwed onto the bladder upper end reinforcement 58 is a lid 59 which supports in its center a threaded rod 60 which is adjustable and lockable with a locknut and which bears against a second ball 61 resting on the thrust cap 62 of the other end of spring 56. The head of rod 60 is covered by a sealing hood 63 screwed onto lid 59.

At the periphery of the upper bladder end, beneath a bolted ring 64, is a seal 65 for cooperating with seat 11.

It will be noted that in the arrangement described above, the flaps 25 protect the valve discharge orifice, particularly against bad weather and sea-water, by cooperating with the cover.

If the tank is at negative pressure, atmospheric air reaches the upper end 58 of the bladder valve, directly through the space between dome 9 and cover 15. The bladder is flattened and compresses spring 56. Such negative pressure may be less than 0.05 bar, for example.

If an overpressure prevails in the tank, operation of the pilot valve, which is supplied through tube 38, vents the interior volume of the bladder through pilot exhaust 66, whereupon the bladder is flattened responsively to the pressure inside the dome, which operates on the border of the valve up to the area where the latter contacts seat 11. Such overpressure may be under 0.24 bar, for instance.

In the valve-flattened situation, indicated by the dot-dash lines 51a, the rim of the valve descends to the plane corresponding to maximum diameter of the casing/dome assembly, thereby establishing a flow of maximum section. In conjunction with the throat zone of this flow on exit from nozzle 14, the jet — in response to which the flaps 25 lift automatically — can discharge at a velocity well in excess of 30 meters per second. In so doing it projects into the atmosphere, with a dilution due to the extractor effect resulting from the air sucked between dome 9 and cover 15, a mixture that is still far from being potentially explosive, and this to a height of more than 20 metres above the superstructure of the ship. This discharge continues until the dynamic and static pressure within the casing 2 reverts to below the rating imparted to membrane 39 by spring 43, and upon closure of valve 40 this pressure is restored in arm 5 and bladder 51, which bladder thereupon reverts to its obturating shape with the help of spring 56.

The entire pilot valve housing 33 may be rotated on mounting plate 8 to permit inspection or maintenance. The tie-rods 29 can then be slackened, followed by nut 23, in order to swing back the cover 15 about the pin 18, thereby to disengage dome 9 from contact with seal 4 and gain direct access to the bladder valve and its auxiliaries.

When closing the system once more by means of tie-rods 29, it is easy to replace the dome 9 in sealing contact with seal 4 once the cover is held fast beneath nut 23. Another rotation of pilot valve housing 33 will then return it into its active position latched by plunger 34.

Changes of rating can easily be made by substituting a different preset unit (comprising a pusher 42, spring 43 and abutment 44) selected from an available range thereof, and this by removing and replacing the plug 46 and the circlip 45.

The flaps 25, which are erected automatically when vapor and gas is discharged, are always urged back into their closed position by the spring, thereby sheltering the valve outlet against bad weather and sea-water by cooperating with the cover 15. These valves may be used in addition as indicator means of the operative and inoperative positions of the valves, such means being readily visible from the ship's bridge.

Lastly, as a safety measure, the wall of casing 2 is provided with an extension 67 fitted with an explosion seam 68 which is protected by a flame-guard grid similarly to dome 13, this assembly being downwardly oriented.

Figure 3:
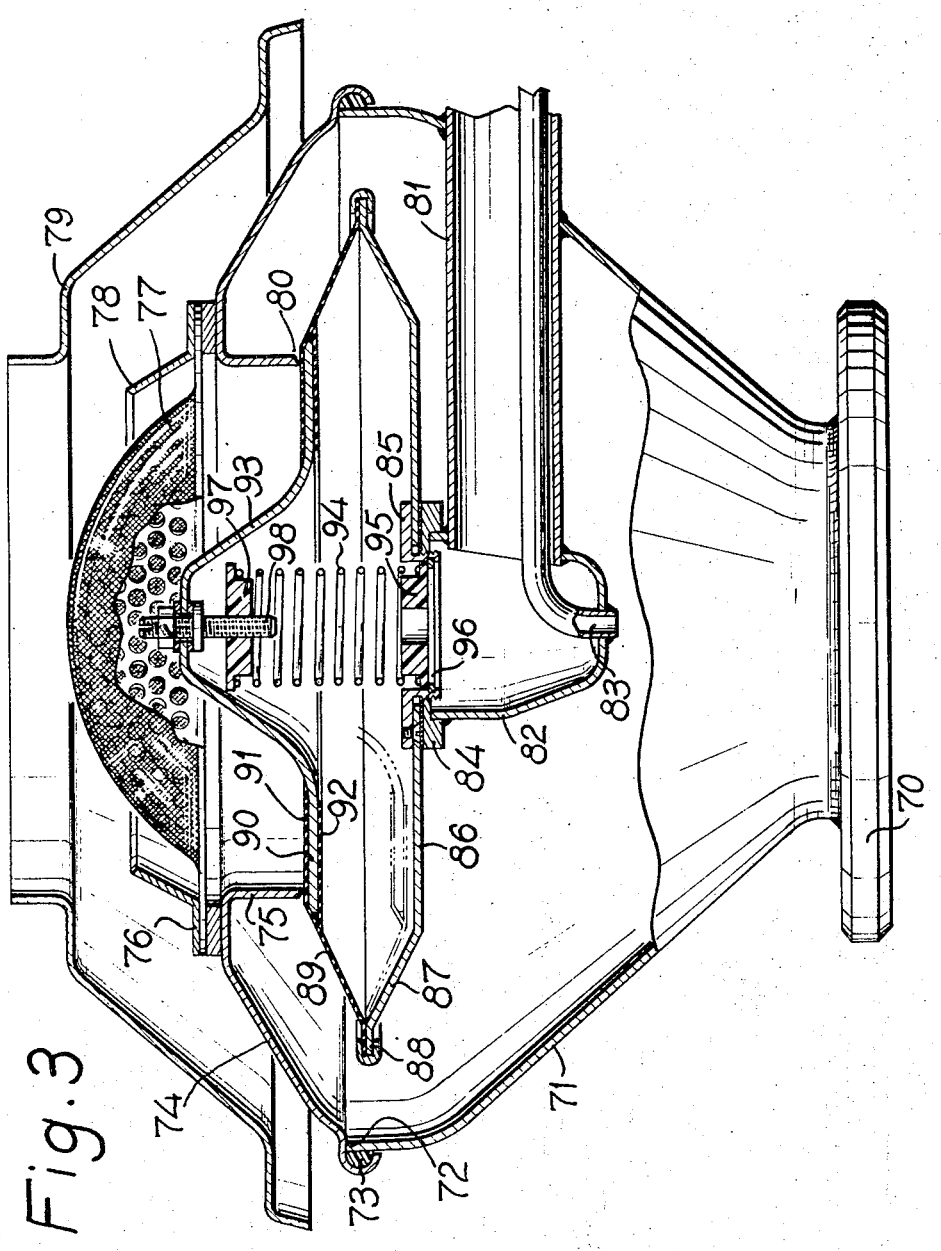
FIG. 3 shows in diagrammatic section a vent valve having obturating means according to an alternative form of embodiment.

In the embodiment shown in FIG. 3, the flange 70 for connection to a storage tank orifice supports a flared casing 71 terminating in a rim 72 upon which rests a dome 74 with an interposed seal 73. The central portion of dome 74 is formed with a circular inwardly directed opening of substantial depth. By means of cooperating seals and flanges 76, the periphery of the opening has fitted thereon the edge of a flame-guard 77 and the base of a discharge nozzle 78, the whole being surmounted by a cover 79. This arrangement is identical to the one described with reference to FIGS. 1 and 2, except for the depth of the rim portion 75, the inner edge 80 of which forms a main-valve seat.

This main valve is supported by a hollow arm 81 which supports, in the axis of casing 71, a circular enclosure 82 having a closed and profiled end from the centre of which debouches a dynamic pressure take-off tube 83.

The open upper end of this enclosure is associated to a flange 84 to which is secured a central annular reinforcement 85 for the inner end surface 86 of the main valve. The central part of end surface 86 is flat but has a peripheral raised frusto-conical wall 87 the upper edge 88 of which flattens out once more. Thus, this fixed inner end surface is substantially pan-shaped.

Sealingly applied against edge 88 is substantially annular-shaped flexible wall 89 the inner portion of which is attached to the periphery of a movable end-surface 90. In this part of its surface, membrane 89 is formed with two lips 91 and 92 between which the edge of the upper end-surface engages. Outer lip 91 contacts seat 80 when outer end-surface 90 moves away from lower end-surface 86, and accordingly acts as a seal.

The central part of the outer end-surface consists of a raised extension 93 which forms a core for profiling the flow downstream of the main valve when the same is open, that is to say when the outer end-surface is applied, after it descends, against the flat central part of lower end-surface 86. This position is shown in dot-dash lines in FIG. 3.

A spring 94 permits distension of the main valve. It rests on a perforated cup 95 which is restrained by an elastic ring 96 engaging into a groove in reinforcement 85. The other end of spring 94 abuts against an opposite cup 97 screwed onto a threaded rod 98 for adjusting the pre-tensioning of spring 94, rod 98 being secured by means of a collar, a plastic seal and a nut into the center of raised portion 93.

The device hereinbefore described with reference to FIG. 3 functions in the following manner:

When the main valve is flattened, end-surface 90 is in contact with end-surface 86. When an ejection flow of gas and vapour from the tank occurs, the flow impinges solely on the rigid walls 86 and 87 and the edge 88 of the inside upstream face of the main valve, the flexible downstream wall 89 thereof being out of contact with the flow. The flow consequently passes easily under the border 75 (which is bounded by the seat 80) and is thereafter effectively straightened out upstream of nozzle 78 by the extension 93. It accordingly becomes a laminar or near-laminar, very-high-velocity flow which helps to project it a great distance from the outlet of the nozzle 78.

When, conversely, the flow is a reverse one of incoming air, the impact against flange wall 89 — which is then positioned on the upstream side — is such less violent, causes no disorderly motion of wall 89, and enters the tank with ease where it cancels out any tendency for a negative pressure to prevail.

In this way the efficiency of flow through the vent valve devised as hereinabove is increased, at any rate in the discharge mode.

By comparison with the embodiment shown in FIG. 1 and 2, apart from the reversed arrangement of the component parts of the main valve, only the seat and the enclosure (i.e., the jacket in FIGS. 1 and 2) have been lowered in order to drop the fixed rim of the inner end-surface of the valve down to the level of the widest part of the casing.

It goes without saying that changes and substitutions of parts may be made in the embodiments hereinbefore described without departing from the scope of the invention. For instance, without in any way affecting the fidelity of response and the precision of operation of the bladder-valve, the latter could be replaced by any other convenient kind of expansion type valve, such as a valve having a fixed cylinder and a movable piston for actuating element adapted to be sealingly applied against the seat.

What is claimed is:

1. A vent valve, for oil tanker storage tanks, comprising, in combination, a casing having an inlet end for connection to a flange defining a storage tank orifice, and terminating at a valve seat, at its end opposite said inlet end, defining a casing outlet opening having a diameter at least equal to that of the opening of said inlet end; an obturator member within said casing beneath said valve seat and engageable therewith; said casing flaring outwardly from its inlet end to a maximum diameter at the plane of said obturator member, in the open position of the latter, to offer a maximum flow section when said obturator member is in its open position in which it is disengaged from said valve seat; a flame guard mounted on the exterior of said casing and surmounting said valve seat; a discharge nozzle mounted on the exterior of said casing, surrounding said flame guard and communicating with the opening defined by said valve seat; said obturator member being an internally expandable obturator member; a tubular arm extending, in sealed relation, through the side wall of said casing to substantially the center of said casing; said obturator member being mounted on the inner end of said tubular member; a mounting plate secured to the outer end of said tubular arm exteriorly of said casing; and a pilot valve mounted in angularly adjustable relation on said mounting plate.

2. A vent valve according to claim 1, including a centrally positioned circular cross-section enclosure supported on the inner end of said arm and having a profiled end directed toward said inlet end of said casing and formed with a port therein; a pressure take-off tube in said tubular arm connecting said port to an aperture through said mounting plate; said enclosure having an annular head at its end opposite said profiled end, and formed with a peripheral flange; a first obturator member end surface reinforcement bolted to said flange; a second reinforcement for the opposite end surface of said obturator member; a cup received in said circular-cross section enclosure and supported on the head thereof; a sealed hood secured centrally to said second reinforcement; an adjusting screw threaded through said second reinforcement beneath said sealed hood; an obturator member expanding spring having one end seated in said cup and its opposite end engaged with said adjusting screw which is operable to adjust the degree of thrust exerted against said spring; and a seal on said second reinforcement engageable with said valve seat.

3. A vent valve according to claim 1, in which said pilot valve comprises a housing rotatably mounted on said mounting plate; and means operable to latch said housing in angularly adjusted position on said mounting plate.

4. A vent valve according to claim 3, in which said pilot valve includes an obturating member; said pilot valve housing being formed with a lodging with a removable plug for accommodating biasing means for said obturating member; said biasing means including a rigidly interconnected pusher, engaging said obturating member, a spring and an abutment; said abutment being inserted into said lodging; a releasable locking ring retaining said abutment in said lodging; and a sealing plug in said lodging outwardly of said locking ring.

* * * * *